United States Patent
Gigengack et al.

(10) Patent No.: US 11,532,100 B2
(45) Date of Patent: Dec. 20, 2022

(54) METHOD FOR ENVIRONMENTAL ACQUISITION, DATA PROCESSING UNIT

(71) Applicant: Robert Bosch GmbH, Stuttgart (DE)

(72) Inventors: Fabian Gigengack, Hannover (DE); Joern Jachalsky, Wennigsen (DE)

(73) Assignee: Robert Bosch GmbH, Stuttgart (DE)

( * ) Notice: Subject to any disclaimer, the term of this patent is extended or adjusted under 35 U.S.C. 154(b) by 230 days.

(21) Appl. No.: 17/110,886

(22) Filed: Dec. 3, 2020

(65) Prior Publication Data

US 2021/0174542 A1 Jun. 10, 2021

(30) Foreign Application Priority Data

Dec. 10, 2019 (DE) .................. 102019219247.5

(51) Int. Cl.
| | |
|---|---|
| *G06T 7/73* | (2017.01) |
| *G01S 13/89* | (2006.01) |
| *G01S 13/931* | (2020.01) |
| *G06V 10/44* | (2022.01) |
| *G06V 20/56* | (2022.01) |

(52) U.S. Cl.
CPC .............. *G06T 7/74* (2017.01); *G01S 13/89* (2013.01); *G01S 13/931* (2013.01); *G06V 10/44* (2022.01); *G06V 20/56* (2022.01); *G06T 2207/30252* (2013.01)

(58) Field of Classification Search
CPC .......... H04N 13/0018; H04N 13/0207; H04N 1/6077; G06T 17/20; G06T 15/83; G06T 15/00; G06T 17/205; G06T 7/90; G01S 19/46; G05D 1/0011; G05D 1/028; A61B 34/10; G01B 15/00; G01N 23/203; A01G 3/08

USPC .................................................. 382/103, 128
See application file for complete search history.

(56) References Cited

U.S. PATENT DOCUMENTS

| | | | |
|---|---|---|---|
| 10,932,859 B2 * | 3/2021 | Chen ...................... | G06T 19/00 |
| 2017/0053433 A1 * | 2/2017 | Gautron ................. | G06T 15/83 |

FOREIGN PATENT DOCUMENTS

| | | |
|---|---|---|
| DE | 102013205882 A1 | 10/2014 |
| WO | 2018060381 A1 | 4/2018 |

OTHER PUBLICATIONS

Han, et al.: "3D reconstruction method based on contour features", J. Beijing Ins. Technol. (2016), 25(3): 301-308.

\* cited by examiner

*Primary Examiner* — Phuoc H Doan
(74) *Attorney, Agent, or Firm* — Norton Rose Fulbright US LLP; Gerard Messina

(57) ABSTRACT

A method for environmental acquisition for acquiring the surrounding environment of a vehicle. Using a plurality of cameras and/or sensor devices, from at least two positions, images of the surrounding environment are produced, and on the basis of the images a free surface, as well as a contour bounding the free surface, are ascertained. Separately for each image and the contour determined on the basis of this image, for a multiplicity of points along the contour, feature vectors are calculated and entered into a one-dimensional array. Through matching of the one-dimensional arrays, correspondences are sought for which the three-dimensional position is subsequently ascertained by triangulation. A computing unit for carrying out at least individual method steps of the method is also described.

14 Claims, 4 Drawing Sheets

METHOD FOR ENVIRONMENTAL ACQUISITION, DATA PROCESSING UNIT

CROSS REFERENCE

The present application claims the benefit under 35 U.S.C. § 119 of German Patent Application No. DE 102019219247.5 filed on Dec. 10, 2019, which is expressly incorporated herein by reference in its entirety.

FIELD

The present invention relates to a method for environmental acquisition, in particular for acquiring the surrounding environment of a vehicle. In addition, the present invention relates to a data processing unit for carrying out the method.

The present invention can be used in the automotive field, in particular in vehicles that drive autonomously or partly autonomously, but can also be used in other areas, such as robotics.

BACKGROUND INFORMATION

In the automotive field, currently 3D point clouds are generated in order to describe the surrounding environment of the vehicle. For each pixel having a valid correspondence (e.g., flux vector or stereo match), these clouds contain an associated 3D point. In the ideal case, there is thus a measurement for each pixel. Due to the quantity of data, a complete representation of the surrounding environment of the vehicle in the form of a 3D point cloud has the disadvantage that the computing expense and memory requirement are very high. In addition, the sending of data between different system modules requires a very large bandwidth.

Therefore, efforts are already being made to reduce the computing expense in the acquisition of the surrounding environment of a vehicle.

German Patent Application No. DE 10 2013 205 882 A1, for example describes a method for driving a vehicle in the environment of an object, the method including the following steps:

- reading in a plurality of view ray endpoints in a three-dimensional image, produced by a stereo camera, of an environment containing the object, at least one of the view ray endpoints representing an external surface of the object,
- connecting the plurality of view ray endpoints to form a polygon that represents a free surface to be traveled on by the vehicle,
- generating a driving corridor provided for the vehicle in order to drive around the object, based on the free surface.

The three-dimensional image is produced in the form of a disparity map based on a first image and a second image of the stereo camera. Here, a predetermined distance value can be assigned to each point of a plurality of points of the three-dimensional image. In order to reduce the computing expense, it is provided that, in a further step, a selection is made of points from the plurality of points of the three-dimensional image, on the basis of which a shape, or a dimension, of the free surface to be driven on by the vehicle can be determined and updated.

Based on the above-mentioned related art, the present invention is based on the object of indicating a method that enables a minimal but adequate representation of a surrounding environment, in particular a surrounding environment of a vehicle.

In order to achieve this object, the present invention provides a method. Advantageous developments of the present invention are described herein. In addition, a data processing unit is indicated for carrying out the method.

SUMMARY

In accordance with an example embodiment of the present invention, a method is provided for environmental acquisition, in particular for acquiring the surrounding environment of a vehicle, in which using a plurality of cameras and/or sensor devices, from at least two positions images of the surrounding environment are produced, and on the basis of the images a free surface, and a contour bounding the free surface, are ascertained, separately for each image and the contour determined on the basis of this image, for a multiplicity of points along the contour, feature vectors are calculated and entered into a one-dimensional array, and by matching the one-dimensional array, correspondences are sought for which the three-dimensional position is subsequently ascertained by triangulation.

By comparing one-dimensional arrays, the correspondence search can be limited to a narrowly bounded region, even to an individual line. This is because, instead of considering the entire camera image, only the contour of the free surface determined therein has to be considered. In this way, the correspondence search is significantly simplified. Although the description of the environment is reduced to a minimum, all relevant information is contained therein, so that, for example in the case of an autonomously driving vehicle, this vehicle is able to perform the required driving task.

Using the example method, the computing expense and computing time can accordingly be reduced. At the same time, the memory requirement is reduced. In addition, a smaller bandwidth is required for transferring information in the form of data.

In a development of the method according to an example embodiment of the present invention, it is provided that the ascertained three-dimensional position is stored in an environment model, a specified reference point, for example a vehicle reference point, being used. In this way, an ascertained three-dimensional position can be returned as environmental information.

Through the use of a plurality of cameras and/or sensor devices, it is ensured that the surrounding environment is recorded from various positions, or is distinguished.

Preferably, the images of the surrounding environment are produced using a set of calibrated cameras and/or sensor devices. That is, the cameras and/or sensor devices are fixedly installed, and the positions and orientations of the cameras and/or sensor devices relative to one another are known. Using such a set of calibrated cameras and/or sensor devices, the spatial position of a point that has been acquired by at least two cameras and/or sensor devices can easily be ascertained through triangulation.

If, alternatively or in addition to the cameras, sensor devices are used to produce an image of the surrounding environment, these can be in particular radar sensors, lidar sensors, and/or ultrasonic sensors.

Preferably, for the ascertaining of the free surface at least one sensor, preferably a radar or lidar sensor, is used. The free surface ascertained using the at least one sensor can then subsequently be transferred into the camera images.

Advantageously, information about the local surrounding environment of a point is derived from the images of the surrounding environment produced using the cameras, and/or from the sensor data, and this information is stored as additional information. In this way, a semantic label that for example identifies an object or obstacle as a vehicle, pedestrian, curb, etc., can be added to the objects or obstacles that bound the free surface. The additional information can be calculated using classical image processing algorithms. The feature vectors stored in a one-dimensional array can thus contain, alongside the information about the respective image position of a point, additional information used for the description of the local surrounding environment of the respective point.

As a further development feature in accordance with the present invention, it is provided that the number of points is quantified along a contour that bounds the free surface. That is, not all points, but only a certain number of points, are considered. For the quantification, for example horizontal view rays can be used that are preferably configured at the same angular distance from one another. Each intersection point of a view ray with a contour defines a point to be considered. In this way, the computing expense is further reduced, because a feature vector does not have to be calculated for every point along a free surface contour.

In addition, in accordance with an example embodiment of the present invention, it is provided that during the matching of the one-dimensional array the epipolar geometry is used, for example in the form of the epipolar line. The epipolar line is specified by the positions and orientations of the cameras and/or sensor devices relative to one another, and can be ascertained for each point along a free surface contour, the epipolar line running through this point. Accordingly, in the correspondence search only the corresponding point of intersection of the epipolar line with the free surface contour has to be found. This is because, as a function of the curve of the contour, the epipolar line can have two, three, or more points of intersection with the contour. In the most disadvantageous case, the contour runs along the epipolar line. In this case, and/or for error correction, a post-estimation can be carried out in a local environment of a found correspondence.

According to a preferred specific embodiment of the present invention, in the correspondence search a previously defined ground plane is used as starting point. The ground plane can for example have been defined earlier in connection with the installation calibration of the cameras and/or sensor devices. Using the ground plane, a spatial position can be derived directly for all points of a free surface contour. Even if the derived position is not completely precise, because the ground plane from the installation calibration does not necessarily have to correspond to the actual shape of the ground, this point can be transformed from one camera or sensor device into another camera or sensor device. The correspondence search is thus limited to a very small region of the one-dimensional array. This results in a (still) robust estimation with very low run time.

In order to distinguish between static and dynamic objects in the environment, in accordance with an example embodiment of the present invention, it is provided that it is investigated whether the three-dimensional position in the environment model, derived from the correspondences, remains constant over time. That is, the method is expanded with a temporal observation. For a dynamic object, in addition the trajectory can be determined in order in this way to enable a prediction of the object movement.

In addition, in order to achieve the object named above, a data processing unit is provided that is set up to carry out at least some method steps of a method according to the present invention. The data processing unit is connected, or is at least capable of being connected, to at least one camera and/or sensor device so as to communicate data.

Below, the present invention is explained in more detail basis on the figures.

DETAILED DESCRIPTION OF EXAMPLE EMBODIMENTS

Figure 1:
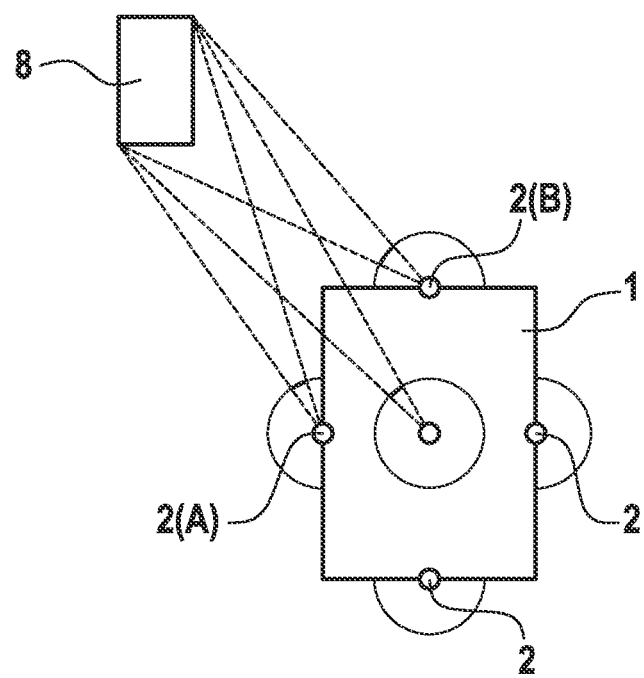
FIG. 1 shows a schematic representation of a vehicle having a set of calibrated cameras for acquiring the surrounding environment.

FIG. 1 shows a vehicle 1 that is equipped with four cameras 2, having a front camera, a rear camera, and two side cameras, the side cameras being situated on different sides of vehicle 1. Thus, each two cameras 2 have an overlapping region of acquisition, so that an object 8 present in the region of acquisition is visible to both cameras 2, from two different positions (A, B).

With the camera setup shown in FIG. 1, a distance estimation using a stereo approach, for example "wide-baseline stereo," is difficult. Using stereo algorithms, local image regions from a first image of a first camera 2 are supposed to be located again in a second image of a second camera 2. Due to the strong geometrical distortions between the different views, which result from the large camera distances, stereo algorithms function here only with limited success.

Figure 2A:
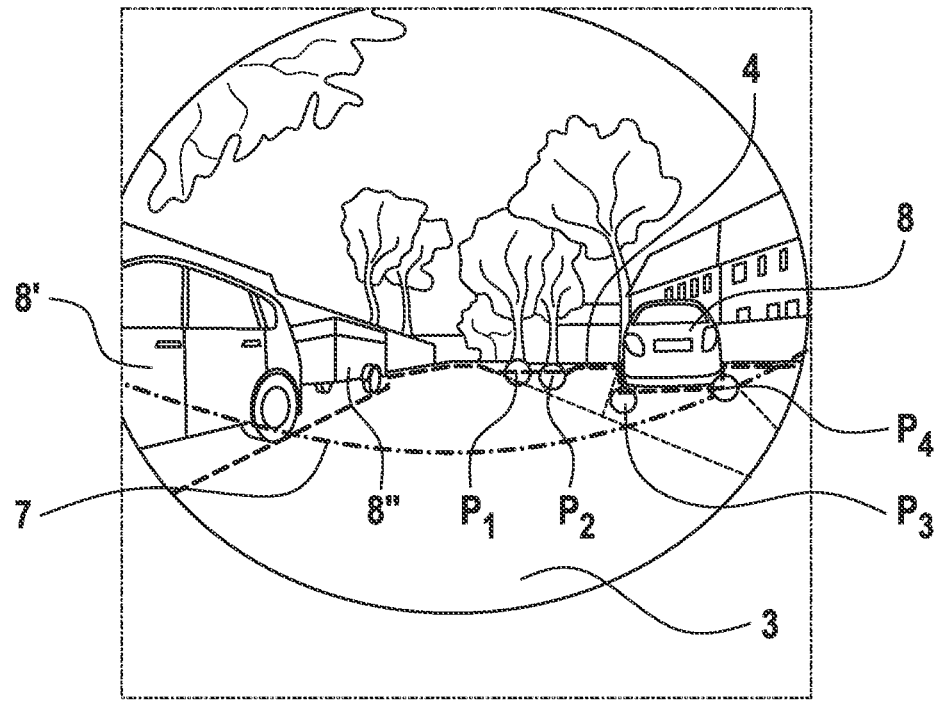
FIG. 2a shows a first image and FIG. 2b) a second image, of a surrounding environment of a vehicle, produced using different cameras.
Figure 2B:
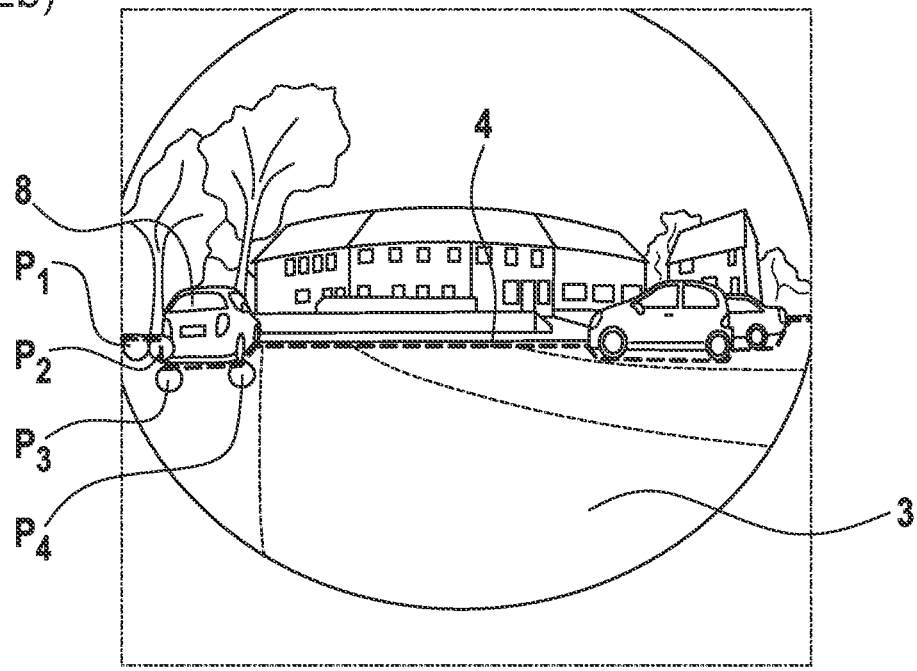

FIGS. 2a) and 2b) show, as an example, two different views or images of a surrounding environment of a vehicle 1, the upper image of FIG. 2a) having been produced by a front camera and the lower image in FIG. 2b) having been produced by a side camera. In each image, a free surface 3 is bounded by a contour 4. Free surface 3 is the drivable surface between vehicle 1 (home vehicle) and at least one object 8, 8', 8", or obstacle. An object 8 situated in the region of acquisition of both cameras 2 can be acquired through points $P_1$, $P_2$, $P_3$, $P_4$ situated on the respective contour 4. Thus, the points $P_1$, $P_2$, $P_3$, $P_4$ are found in both images. In order to determine the spatial position of these points $P_1$, $P_2$, $P_3$, $P_4$, a matching has to be carried out, i.e. correspondences must be sought. With the use of the method according to the present invention, the search can be limited to a line, namely contour 4. That is, the entire image does not have to be searched for correspondences, which significantly reduces the computing expense. If in addition an epipolar line 7 is used in the correspondence search, then the search can be limited to the points of intersection of epipolar line 7 with contour 4.

Figure 3:
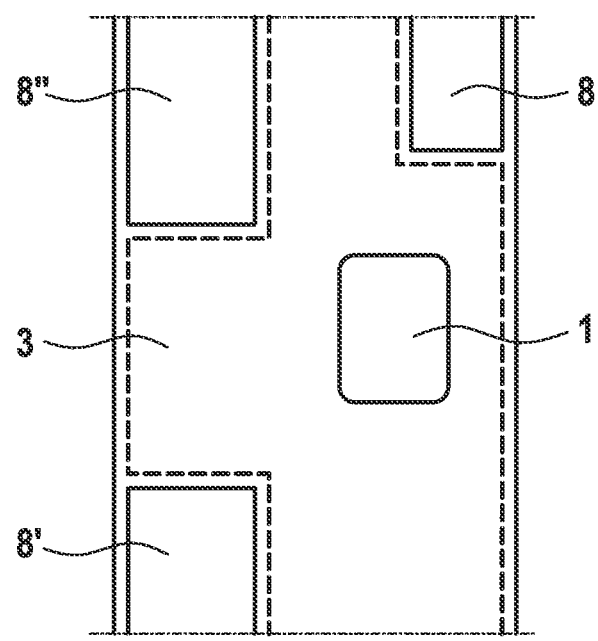
FIG. 3 shows a schematic representation of a vehicle in a typical surrounding environment.

FIG. 3 shows a traffic situation in a top view, corresponding approximately to the views or images of FIG. 2. (Home) vehicle 1 is situated in the center. The surface between vehicle 1 and surrounding objects 8, 8', 8'', or obstacles, corresponds to free surface 3. Here it does not matter whether the surface is situated in front of, behind, or next to vehicle 1. In order to acquire all the objects 8, 8', 8'', vehicle 1 has to be equipped with a plurality of cameras 2.

Figure 4:
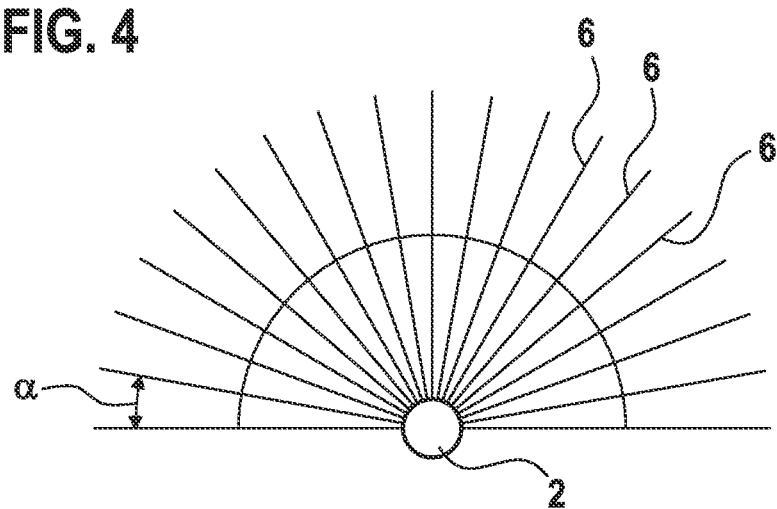
FIG. 4 shows a schematic representation of the region of acquisition of a camera with view ray division.

An object 8 situated in the region of acquisition of a camera 2 is determined by a multiplicity of points $P_1$, $P_2$, $P_3$, ..., $P_n$ along contour 4. In order to reduce the number of points for which a correspondence has to be sought in another image, the region of acquisition of a camera 2 is divided by view rays 6. This is shown as an example in FIG. 4. The point of intersection of a view ray 6 with contour 4 then determines in each case a point to which the correspondence search is limited.

On the basis of FIGS. 6 and 7, in the following the sequence of a method according to the present invention is described.

Figure 6:
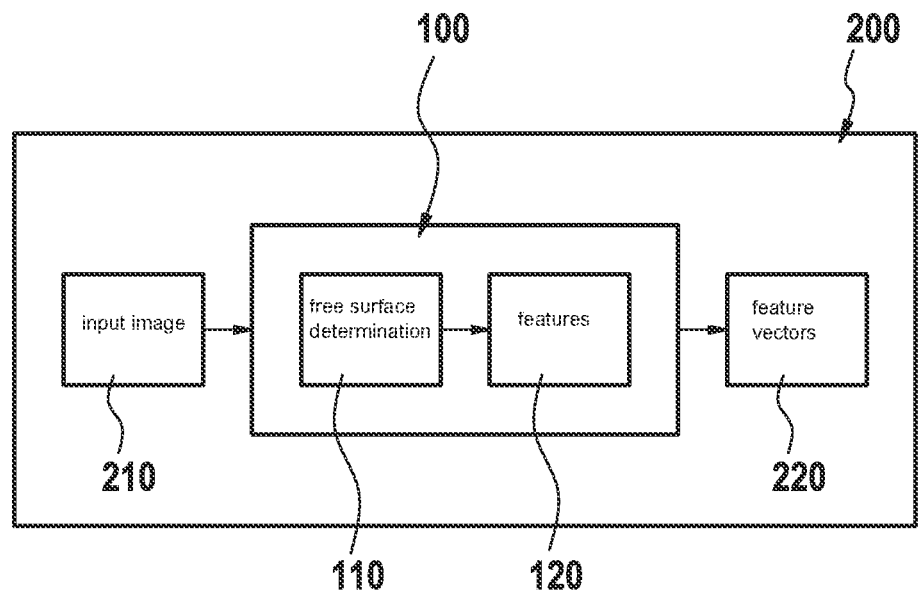
FIG. 6 shows a schematic representation for the explanation of a method sequence in accordance with an example embodiment of the present invention.

FIG. 6 shows a system 200 in which an input image 210, for example a first image of the surrounding environment taken with a camera, is given to a subsystem 100. As output of subsystem 100, system 200 receives a one-dimensional array of feature vectors 220. Subsystem 100, to which input image 210 is given, is made up of a free surface determination 110 on the basis of which features 120 are calculated and points are assigned that are situated along a contour that bounds the free surface.

Figure 7:
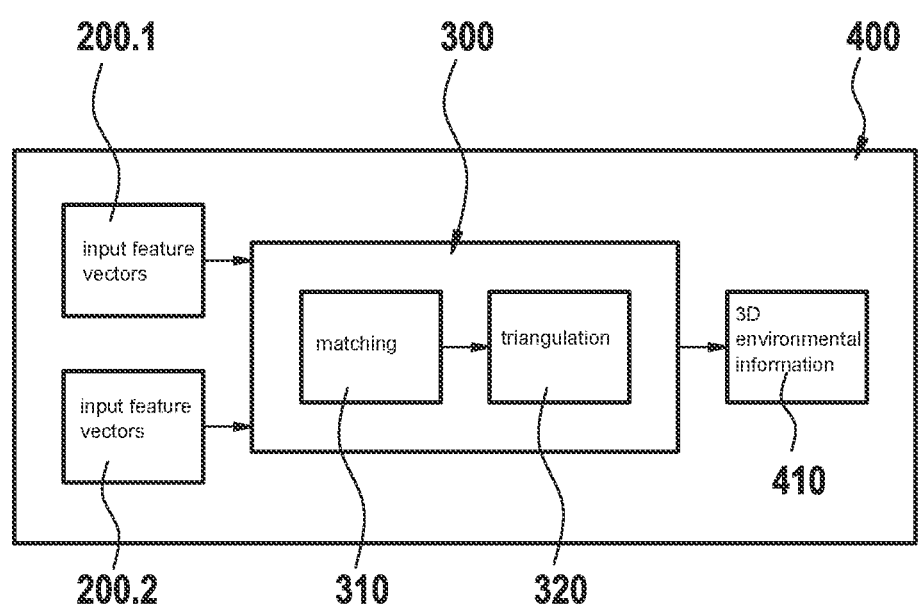
FIG. 7 shows a further schematic representation for the explanation of the example method sequence.

FIG. 7 shows an overall system 400 that is based on the system 200 of FIG. 6 and that is used for the determination of three-dimensional environmental information 410 in the form of a compact one-dimensional array. Previously, system 200 of FIG. 6 was applied to two input images 210, so that for each input image 210 there is a one-dimensional array of feature vectors 220 as output. The outputs, in turn, are used as inputs 200.1 and 200.2 of the overall system 400. These inputs are given to a subsystem 300, in which first a matching 310 is carried out of the feature vectors from the one-dimensional arrays. Through triangulation 320, for each found correspondence the position in space is subsequently determined, and is stored at a specified reference point in an environmental model.

Figure 5:
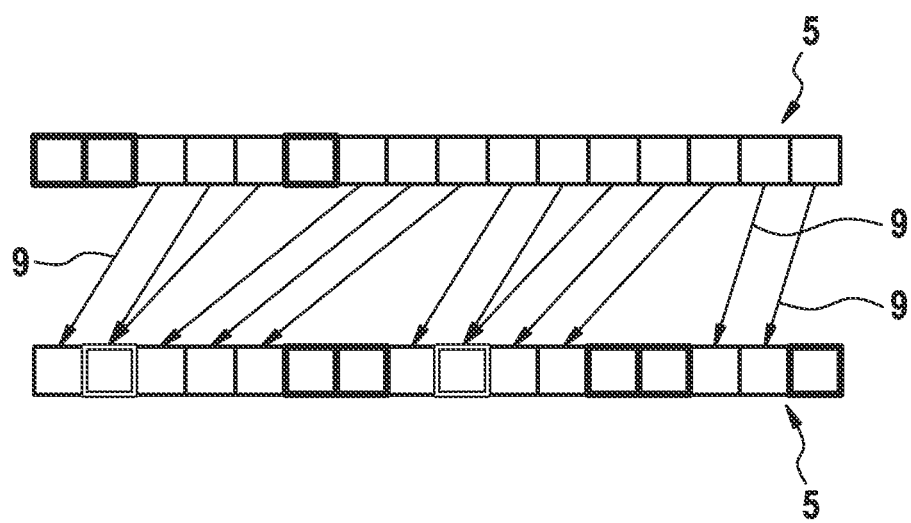
FIG. 5 shows a schematic representation of two one-dimensional arrays of feature vectors during the matching.

A way of visualizing the matching 310 is shown as an example in FIG. 5 for two one-dimensional arrays 5 having a plurality of feature vectors. The individual feature vectors are indicated by individual boxes that can be assigned, individually or in groups, to different objects 8, or obstacles. For each feature factor of upper array 5, a correspondence is sought in the array 5 below it. Arrows 9 indicate correspondences that have been found. In the matching, the following cases can occur:
there is a one-to-one assignment
a plurality of feature vectors of upper array 5 are assigned to one feature vector of the array 5 below it
there is no assignment for a feature vector in one of the two arrays 5.

Here, the correspondence search is represented as a orderly problem, because arrows 9 do not cross one another in the assignment.

What is claimed is:

1. A method for environmental acquisition for acquiring a surrounding environment of a vehicle, the method comprising the following steps:
using a plurality of cameras and/or sensor devices, from at least two positions, producing images of the surrounding environment, and ascertaining, based each of the images, a respective free surface and a respective contour bounding the respective free surface;
separately, for each of the images, for a multiplicity of points along the respective contour, calculating feature vectors and entering the features vectors into a respective one-dimensional array;
determining correspondences by matching the respective one-dimensional arrays; and
ascertaining, based on the correspondences, a three-dimensional position using triangulation.

2. The method as recited in claim 1, wherein the ascertained three-dimensional position is stored in an environment model using a specified reference point.

3. The method as recited in claim 2, wherein the specified reference point is a vehicle reference point.

4. The method as recited in claim 1, wherein the images of the surrounding environment are produced using a set of calibrated cameras and/or sensor devices.

5. The method as recited in claim 1, wherein at least one sensor is used to ascertain the free surface.

6. The method as recited in claim 5, wherein the sensor is a radar sensor or a lidar sensor.

7. The method as recited in claim 1, wherein from the images of the surrounding environment and/or sensor data, information is derived about a local surrounding environment of a point, and is stored as additional information.

8. The method as recited in claim 1, wherein a number of points along each respective contour that bounds the respective free surface is quantified.

9. The method as recited in claim 1, wherein a number of points along each respective contour that bounds the respective free surface is quantified by horizontal view rays configured at the same angular distance from one another.

10. The method as recited in claim 1, wherein in the matching of the respective one-dimensional arrays, epipolar geometry is used in the form of an epipolar line.

11. The method as recited in claim 1, wherein, for error correction, a post-estimation is carried out in a local surrounding environment of a found correspondence.

12. The method as recited in claim 1, wherein in the determining of the correspondences, a previously defined ground plane is used as a starting point.

13. The method as recited in claim 1, wherein, to distinguish between static and dynamic objects in the surrounding environment, it is investigated whether the three-dimensional position in the environment model, derived from the correspondences, remains constant over time.

14. A data processing unit configured for environmental acquisition for acquiring a surrounding environment of a vehicle, the data processing unit configured to:
using a plurality of cameras and/or sensor devices, from at least two positions, produce images of the surrounding environment, and ascertain, based each of the images, a respective free surface and a respective contour bounding the respective free surface;
separately, for each of the images, for a multiplicity of points along the respective contour, calculate feature vectors and entering the features vectors into a respective one-dimensional array;
determine correspondences by matching the respective one-dimensional arrays; and ascertain, based on the correspondences, a three-dimensional position using triangulation;
wherein the data processing unit is connected to or capable of being connected to, at least one camera and/or sensor device in such a way as to communicate data.

* * * * *